United States Patent
Paulo

(10) Patent No.: US 6,703,926 B2
(45) Date of Patent: Mar. 9, 2004

(54) VEHICLE DATA COMMUNICATION SYSTEM WITH HAND-HELD WIRELESS CONTROL AND DISPLAY UNIT

(75) Inventor: Sergio Alexandre Paulo, Kingsville (CA)

(73) Assignee: Yazaki North America, Canton, MI (US)

( * ) Notice: Subject to any disclaimer, the term of this patent is extended or adjusted under 35 U.S.C. 154(b) by 171 days.

(21) Appl. No.: 10/035,748

(22) Filed: Nov. 8, 2001

(65) Prior Publication Data

US 2003/0085805 A1 May 8, 2003

(51) Int. Cl.$^7$ ................................................. B60Q 1/00
(52) U.S. Cl. .......................... 340/425.5; 340/426.13; 340/426.17; 340/539.1; 340/539.11; 340/691.6
(58) Field of Search ................... 340/425.5, 426.1, 340/426.13, 426.17, 426.21, 426.22, 426.24, 426.25, 426.34, 539.1, 539.11, 539.25, 691.6, 693.5, 321, 461

(56) References Cited

U.S. PATENT DOCUMENTS

| | | | |
|---|---|---|---|
| 5,680,105 A | * | 10/1997 | Hedrick ...................... 340/571 |
| 5,794,164 A | | 8/1998 | Beckert et al. ................. 701/1 |
| 6,100,792 A | * | 8/2000 | Ogino et al. ............. 340/426.1 |
| 6,127,922 A | * | 10/2000 | Roddy et al. ............ 340/426.1 |
| 6,233,506 B1 | * | 5/2001 | Obradovich et al. ........... 701/1 |

FOREIGN PATENT DOCUMENTS

| | | |
|---|---|---|
| JP | 08-130486 | 5/1996 |
| JP | 10-260759 | 9/1998 |
| JP | 2001-004387 | 1/2001 |

* cited by examiner

*Primary Examiner*—Daryl Pope
(74) *Attorney, Agent, or Firm*—Young & Basile, P.C.

(57) ABSTRACT

An onboard, multi-channel vehicle communication system uses a wireless hand-held control and display unit which can be removed from a charging cradle and moved about the interior of an automotive vehicle. An alarm function reminds the user of the hand-held unit that he/she is leaving the immediate area of the vehicle.

7 Claims, 4 Drawing Sheets

VEHICLE DATA COMMUNICATION SYSTEM WITH HAND-HELD WIRELESS CONTROL AND DISPLAY UNIT

FIELD OF THE INVENTION

This invention relates to onboard automotive vehicle communication systems of the type having a vehicle mounted onboard computer such as a microprocessor or micro controller with multiple input channels for receiving data from a variety of sources such as satellites, RF links, telephonic links and onboard vehicle operation and condition monitors. The invention further includes a wireless hand-held control and display unit coupled to the onboard computer by way of complemental transceivers.

BACKGROUND OF THE INVENTION

Automotive vehicles have been equipped with one-way and two-way radio receivers for many years. More recently, it has become possible to equip motor vehicles for satellite communication as well as land-based signal communication. As a result it is possible for vehicles to receive navigation data, e-mails and faxes.

A characteristic of virtually all onboard automotive communication systems is the use of a "fixed base" approach; i.e., the control and display units for the devices identified above are typically built into the vehicle within the driver's reach and field of vision. Moreover, the units are typically separate such that a multiple-function capability results in multiple control and display units in the vehicle.

SUMMARY OF THE INVENTION

A principal object of the present invention is to provide an onboard vehicle communication system capable of receiving data from various sources in various formats and according to various protocols and having the added convenience of a capability for selecting and displaying information and images not only to the operator but to the passengers of the vehicle in various locations. In general this is accomplished through the provision of a multi-channel vehicle communication system having a fixed base, permanently installed unit which includes a data processor such as a microprocessor or micro controller capable of handling each of a plurality of different data input channels such as satellite signals, radio signals, onboard programs and vehicle operating and/or condition monitors such as tire and oil pressure transducers. In addition the invention comprises a hand-held, battery-operated, wireless control and display unit which is linked to the fixed base computer by way of wireless transceivers. The portable control and display unit normally resides in a holder/recharger cradle having contacts to recharge the battery of the hand-held unit similar to the fashion in which wireless telephones are recharged. In addition the hand-held control and display unit comprises a display screen using LED or TFT technology and a number of buttons or switches for comprehensive selection and control purposes. The portable unit can be removed from its recharger cradle by the operator or any passenger of the vehicle to select, receive and control any of the various programs or input data channels.

In accordance with a further aspect of the invention, the range of the transceivers is deliberately limited such that the data communications link is only maintained as long as the control and display unit remains in close proximity to the vehicle. In accordance with this aspect of the invention an alarm is provided to warn the user that the portable unit is going beyond the range of the transceiver link thereby reducing the probability that the control/display unit will be inadvertently carried off by someone other than the owner of the passengers of the vehicle.

In accordance with a still further aspect of the invention, the hand-held unit incorporates a locator function similar to that used for hand-held wireless telephones; i.e., a button or the like may be pushed on the fixed base unit to cause the portable unit to emit an audible signal so that it may be found within the automobile.

In accordance with a still further aspect of the invention, the communications transceiver protocol is preferably selected so that the portable unit is only operable with and in combination with the fixed base unit of a particular automobile. This can be achieved using the "code hopping" technology used in the garage door operator art.

These and other features and advantages will be best understood from a reading of the following specification describing an illustrative embodiment of the invention.

BRIEF DESCRIPTION OF THE DRAWINGS

The description herein makes reference to the accompanying drawings wherein like reference numerals refer to like parts throughout the several views, and wherein.

DETAILED DESCRIPTION OF THE ILLUSTRATIVE EMBODIMENT

Figure 1:
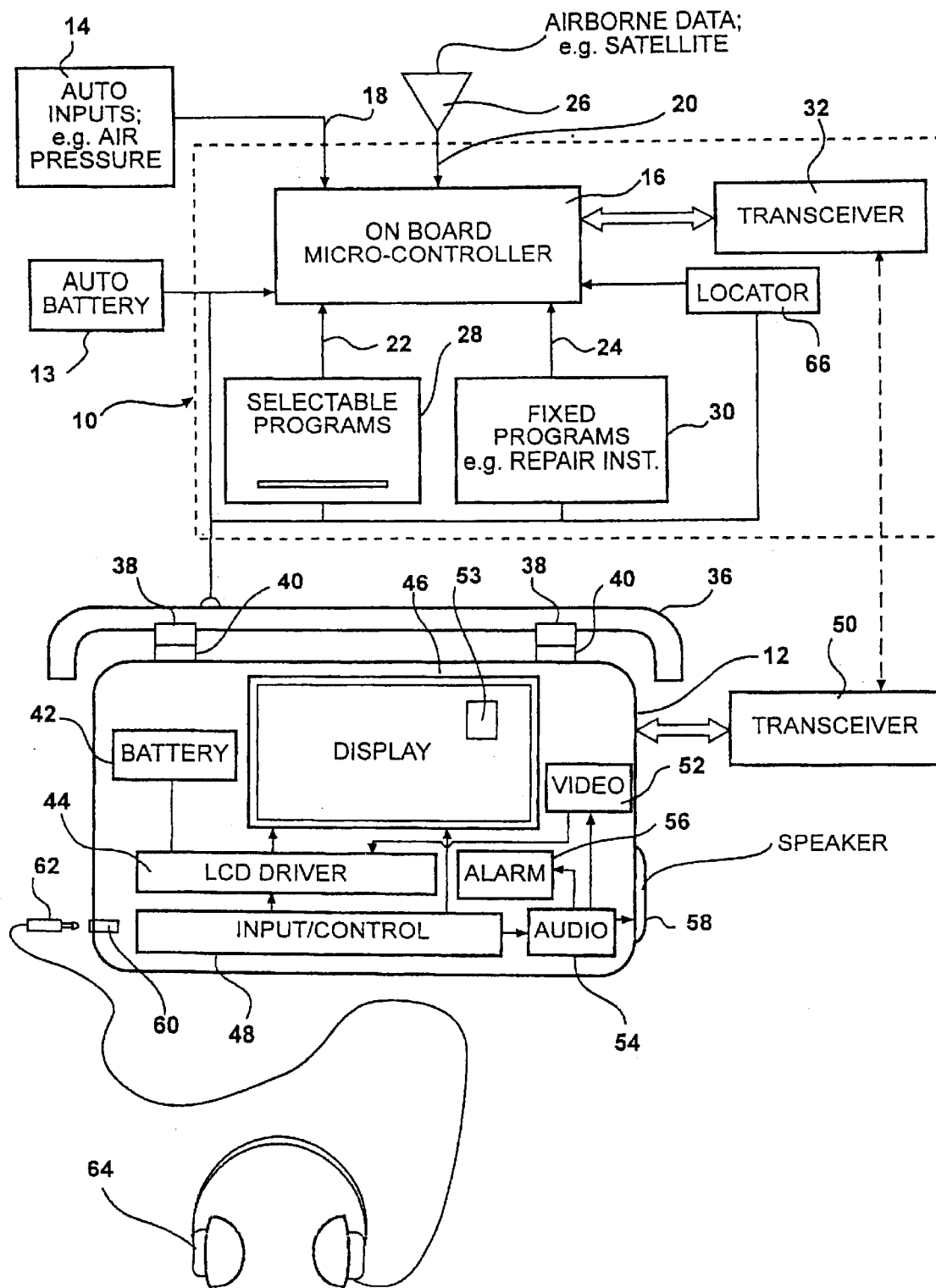
FIG. 1 is a block diagram of an illustrative embodiment of the invention.

FIG. 1 shows a data communication and display system for an automotive vehicle 100 comprising a fixed base or permanently onboard data receiving and processing unit 10 and a wireless hand-held control and display unit 12. Unit 10 is permanently mounted in the vehicle and connected to the vehicle battery 13 as well as to a number of transducers 14 adopted to monitor the condition of various instrumentalities and/or mechanisms on the vehicle; an example is a tire pressure monitor capable of producing an electrical signal representing tire pressure.

The principal component of the fixed base unit 10 is an onboard computer 16, preferably a micro controller having input data channels 18, 20, 22 and 24. Input channel 18 is connected to the transducers 14; input channel 20 is connected to an antenna or antenna group 26 for receiving airborne data such as RF, audio signals, video signals, emergency warning signals and navigation signals from both satellites and ground-based transmitters. Input channel 22 is connected to a fixed base unit 28 such as a CD player for inputting user-selected data to the micro controller 16. Input channel 24 is connected to a memory unit 30 containing one or more resident programs such as a tire changing instructional program with text and images installed at the vehicle assembly factory.

The fixed base unit 10 further comprises a transceiver 32 connected to the micro controller 16 by way of a data link 34. The transceiver 32 is a short-range; i.e., 5-to-15 foot range, low power transmitter/receiver unit capable of operating on any of a number of short-range coded or encrypted data transmission/reception protocols such as BLUE TOOTH.

The portable wireless hand-held unit 12 normally rests in a cradle 36 (FIGS. 4, 5, 6) having contacts 38 connected to the battery 13 and mating with contacts 40 on the unit 12 to recharge a battery 42 in the unit 12. Unit 12 can be readily removed from the cradle 36 and moved around the vehicle as well as removed entirely from the vehicle.

Figure 2:
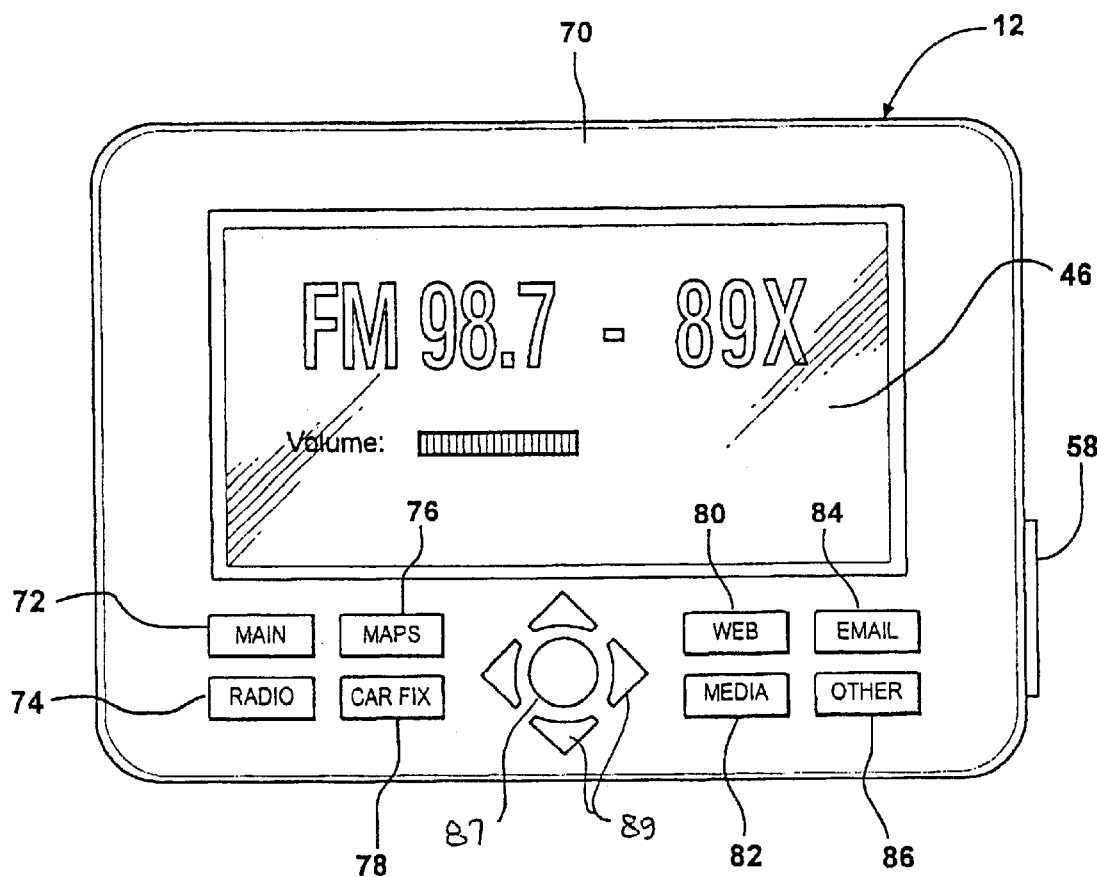
FIG. 2 is a front view of an illustrative hand-held unit.

Unit 12 further comprises an LCD driver circuit 44 connected to an LCD display 46 of 5 or 6 square inches in area, the display data being selected by means of an input control unit 48 which, as is more specifically described with reference to FIG. 2 an assembly of buttons and/or knobs to be described.

Unit 12 is further equipped with a transceiver 50 which matches the transceiver 32 and is adapted to receive signals from the transceiver 32 as well as to send signals back to the transceiver 32 as required.

Unit 12 comprises a video receiver decoder 52, an audio signal receiver decoder 54, an audio alarm 56 and an external speaker 58. A pin-type plug connector 60 is provided on the left exterior surface of the unit 12 to receive a coaxial pin plug 62 associated with a head set 64 for private audio listening purposes.

Unit 10 is provided with a locator signal generator 66 which may be activated by means of a push button on the unit 10 to cause a locator signal to be transmitted by the transceiver 32 to the transceiver 50. This locator signal activates the alarm 56 to produce an audible signal by way of the speaker 58 which facilitates locating the unit 12 whenever it is not replaced on the cradle 36.

By way of example the transducers 14 may comprise a tire pressure signal transducer, a PCV valve condition signal transducer, an odometer transducer and an oil pressure transducer. Numerous other vehicle mechanisms which require monitoring and/or the generation of an alarm signal and/or display at specific mileage intervals may be included in this list. By way of example, an odometer transducer connected to the input 18 may signal the onboard micro computer 16 that a significant mileage level has been reached. At this time the onboard micro controller retrieves a display address from memory and outputs a signal by way of transceiver 132 to the transceiver 50 which displays to the user the need for servicing of the PCV valve, catalytic converter, oil supply and the like. Trip information similar to that currently generated using onboard trip computers may also be generated on the display 46 in the same fashion. A flasher function is incorporated by way of light 53.

By way of example the signals input to antenna group 26 and input channel 20 to the micro controller 16 may include navigation data from a satellite or ground-based antenna transmitter as well as conventional radio and television data and wireless telephonic data such as that currently associated with the so-called cellular phones. This data is processed by the micro controller 16 to produce outputs from transceiver 32 which are sent to and received by transceiver 50 when within the allowable range of the system to create a suitable display on screen 46 and audio outputs on speaker 58.

Unit 28 may be used by way of input channel 22 to play direct video disks, CDs, audio cassettes and other user selectable data sources. Unit 30 may be used to display factory installed programs such as the tire change routine mentioned above. Vehicle fueling instructions, oil change instructions, maintenance instructions and so forth may also be included in this program.

The BLUE TOOTH protocol is a computing and telecommunications industry specification used in mobile phones, computers and personal digital assistants to make short-range wireless interconnections. The transceiver devices 32 and 50 each include a microchip transceiver that transmits and receives in the frequency band of 2.45 GHz that is available globally with some variation of bandwidths in different countries. In addition to data up to three voice channels are available. Each device has a unique 48-bit address available from the IEEE 802 standard. Connections can be point-to-point or multipoint. Maximum range is 10 meters but the preferable range for use in the automotive application described in this patent is approximately 15 feet. Data can be exchanged at a rate of 1 megabit per second.

To uniquely associate each hand held unit 12 with a particular unit 10 a frequency encryption scheme is used. This scheme includes a "frequency hop" scheme which is proprietary to Microchip Technologies of Palo Alto, Calif.

Figure 3:
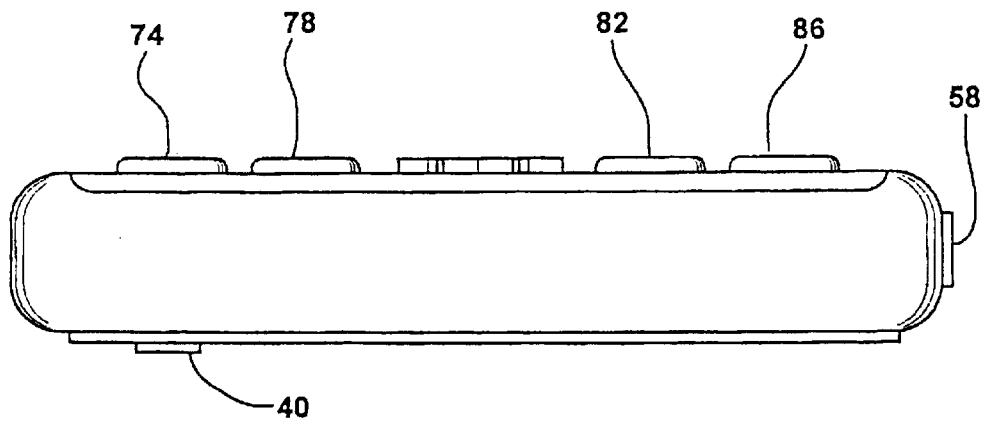
FIG. 3 is a side view of the illustrative hand-held unit of FIG. 2.

Referring now to FIGS. 2 through 6 an illustrative packaging concept for the hand-held unit 12 is shown to comprise a generally rectangular plastic housing 70 having a display screen 46 of approximately 6 square inches and battery charging contacts 40 on the reverse or backside thereof. Control 48 comprises in this case a series of 8-push buttons and a centrally mounted 5 piece push button and directional arrow combination for programming and control purposes using popularly known conventions. The main switch 72 turns the unit on-and-off and/or produces a set up function or main menu. A radio control button 74 is provided under the On/off switch 72. Maps can be selected from the unit 30 from unit 28 using push button 76. Automobile maintenance or repair routines can be selected from unit 30 using push button 78. An internet connection can be selected using push button 80. Other media connections can be selected by using push button 82. An e-mail connection may be selected using push button 84. Other functions can be selected using push button 86. Point select and cursor control buttons 87, 89 are located in the center of the input panel. The speaker 58 may be located on the side of the unit as shown in FIG. 3.

Figure 4:
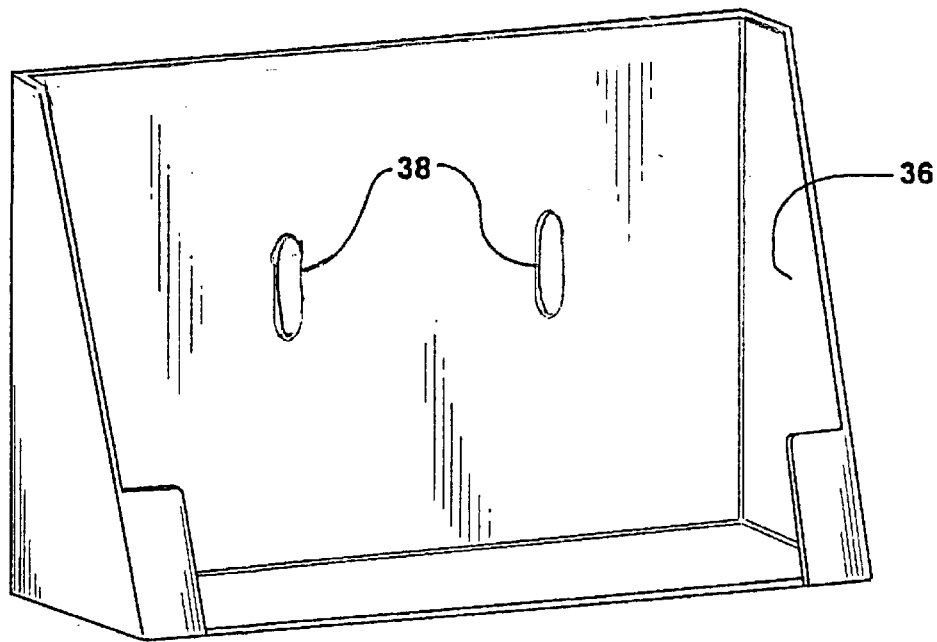
FIG. 4 is a perspective view of a recharge holder cradle for use in combination with the portable unit of FIGS. 2 and 3.
Figure 5:
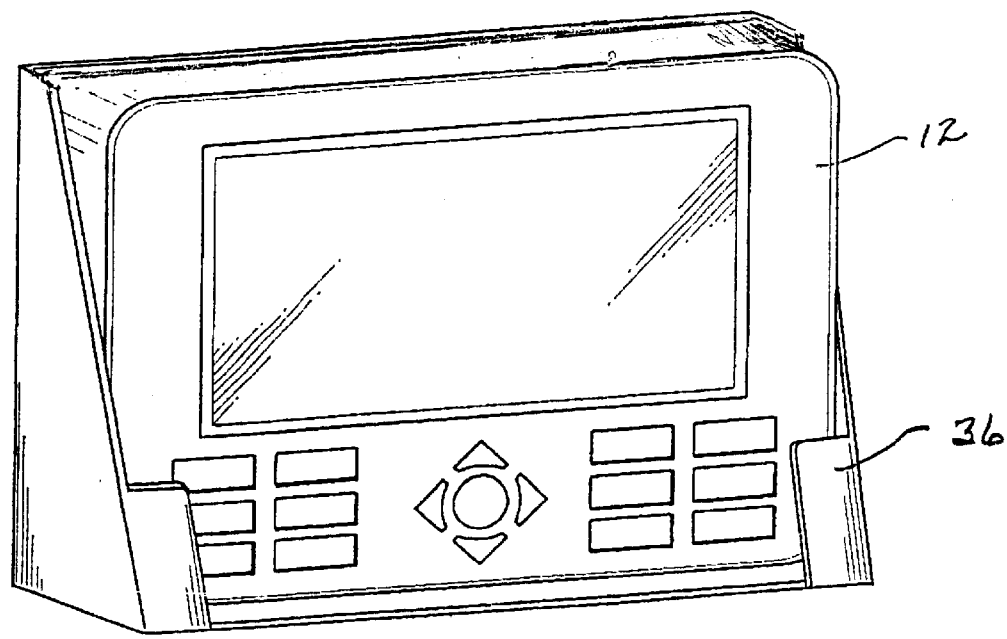
FIG. 5 is a view of the charger cradle with the hand-held unit in place.
Figure 6:
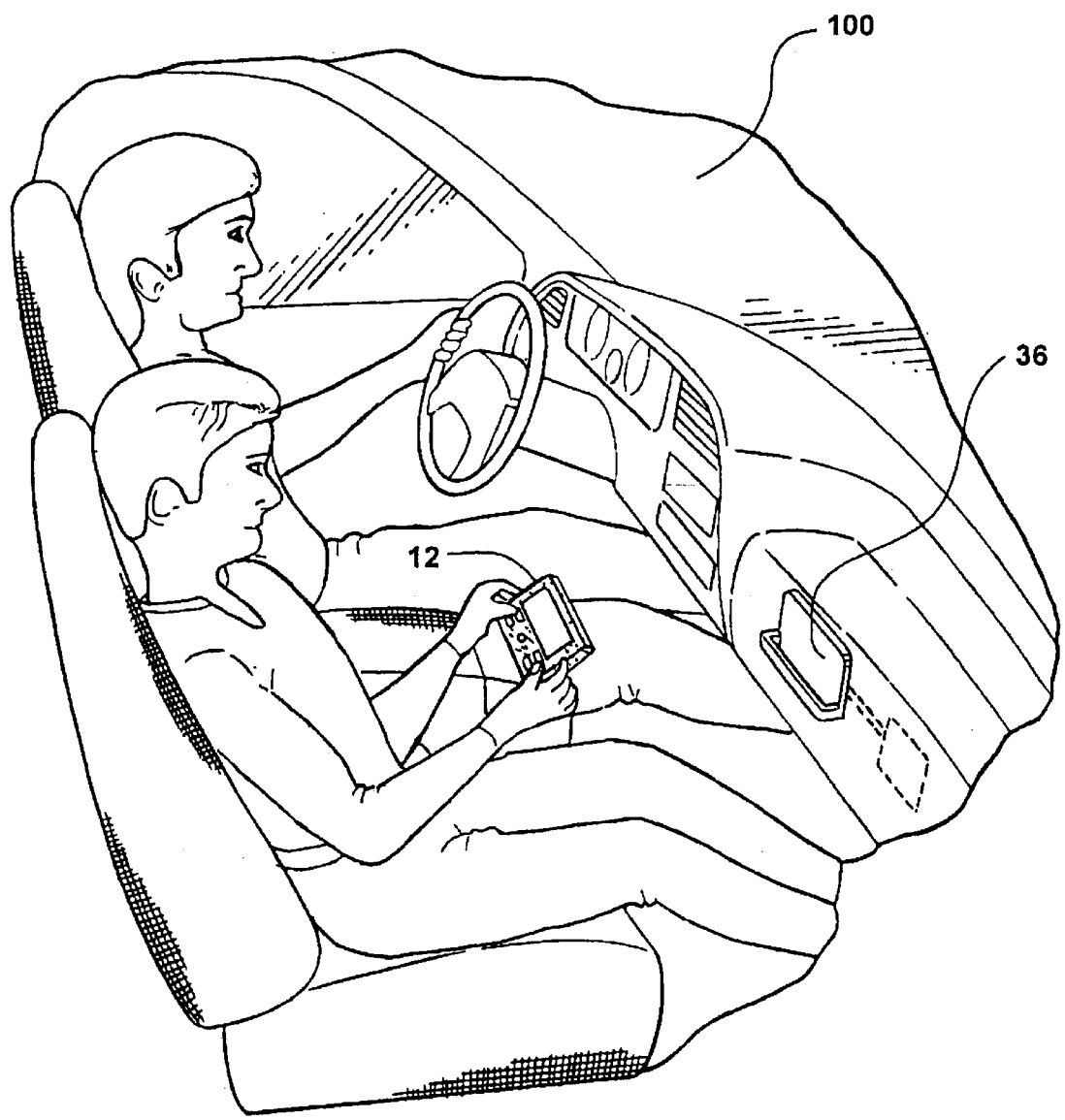
FIG. 6 is a view of the interior of an automobile showing the invention in use.

Looking now to FIGS. 4 and 5 one possible configuration for the cradle 36 is shown. The contacts 38 are located on the rear surface of the cradle 36 and it is otherwise shaped and sized to receive the unit 12 therein.

Of course various modifications and additions to the unit described can be made. Whereas the display 46 uses LCD technology in the illustrative embodiment, TFT or thin film transistor technology may also be used for the screen in which case the LCD driver circuit 44 is replaced with a TFT driver. The computer 16 can be any of a variety of sizes and configurations ranging from micro controllers to micro processors and various other solid state devices.

In operation the driver or any passenger in vehicle 100 may remove the unit 12 from the cradle 36 and turn it on by way of push button 72. The user then selects any of the various desired display data displays ranging from useful information concerning the maintenance of the vehicle to communications data to navigation information to pure entertainment. The unit 12 may be passed from person-to-person among passengers using the same vehicle. An individual wishing to listen to a particular program in a private fashion may use the headset 64 in combination with volume control provided by the central array of buttons on the unit 12.

If the unit 12 is inadvertently carried from the vehicle 100, in for example, the pocket of a non-owner-user, a reduction in the received signal amplitude triggers an audio alarm from the unit 12 whether it is on or off. This function may be terminated a few minutes after the vehicle door has been closed and/or the vehicle locking system has been activated. In the event an audio alarm is generated it reminds the carrier of the unit to return it to the vehicle and place it in the recharger cradle.

Should a user leave the unit 12 for example in the back seat of a conventional vehicle or in the trunk or rear of the station wagon or SUV-type vehicle where the operator cannot immediately locate it, the unit can be readily and quickly found by triggering the locator function using unit 66.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A data communication system for an automotive vehicle having an onboard battery comprising:
   (a) a fixed-base data receiving and processing unit adapted to be installed on the vehicle and connected to the vehicle battery;
   said fixed-base unit including:
   1. a plurality of inputs for data to be processed;
   2. an output for processed data; and
   3. a first short-range data transceiver connected to the output;
   (b) a wireless, hand held control/display unit having:
   1. a second short-range data transceiver linkable to the first transceiver to communicate displayable data and control data therebetween;
   2. a display for displaying data received by the second transceiver;
   3. a rechargeable battery; and
   4. a video signal portion, the video signal portion being linked to the second transceiver for receiving output signals in the form of displayable data therefrom, the video signal portion being connected to the display; and
   (c) a holder/recharger adapted to be installed on the vehicle to receive the hand-held unit; said holder/recharger and said hand-held unit having complemental contacts thereon for recharging said hand-held unit from the vehicle battery.

2. A system as defined in claim 1 wherein said hand-held control/display unit further comprises an audio signal portion and a speaker, the audio signal portion being linked to the second transceiver and connected to the speaker.

3. A system as defined in claim 1 wherein said plurality of inputs includes a RF input channel for receiving data.

4. A system as defined in claim 1 further comprising one or more displayable data sources selected from a group consisting of a tire pressure transducer, an oil pressure transducer, a radio signal source, a video signal source, an onboard multiple program instructional data source and an entertainment data source.

5. A system as defined in claim 1 wherein said wireless hand-held control/display unit is of such size and weight as to be readily held, manipulated and transported by an ordinary adult human.

6. A data communication system for an automotive vehicle having an onboard battery comprising:
   (a) a fixed-base data receiving and processing unit adapted to be installed on the vehicle and connected to the vehicle battery;
   said unit including:
   1. a plurality of inputs for data to be processed;
   2. an output for processed data; and
   3. a first short-range data transceiver connected to the output;
   (b) a wireless, hand-held control/display unit having:
   1. a second short-range data transceiver linkable to the first transceiver to communicate displayable data and control data therebetween;
   2. a display for displaying data and/or received by the second transceiver; and
   3. a rechargeable battery;
   (c) a holder/recharger adapted to be installed on the vehicle to receive the hand-held unit; said holder/recharger and said hand-held unit having complemental contacts thereon for recharging said hand-held unit from the vehicle battery; and
   (d) means for generating an audible alarm for said wireless unit whenever it is beyond the operating range of the transceiver link.

7. A data communication system for an automotive vehicle having an onboard batten comprising:
   (a) a fixed-base data receiving and processing unit adapted to be installed on the vehicle and connected to the vehicle battery;
   said unit including:
   1. a plurality of inputs for data to be processed;
   2. an output for processed data and
   3. a first short-range data transceiver connected to the output;
   (b) a wireless, hand-held control/display unit having:
   1. a second short-range data transceiver linkable to the first transceiver to communicate displayable data and control data therebetween;
   2. a display for displaying data and/or received by the second transceiver; and
   3. a rechargeable battery; a holder/recharger adapted to be installed on the vehicle to receive the hand-held unit; said holder/recharger and said hand-held unit having complemental contacts thereon for recharging said hand-held unit from the vehicle battery; and
   (d) means in said fixed base unit for triggering the generation of an audible locator signal from said wireless unit.

* * * * *